United States Patent [19]

Morgan

[11] 4,115,657
[45] Sep. 19, 1978

[54] RANDOM DIGITAL CODE GENERATOR

[75] Inventor: Barrie O. Morgan, Dallas, Tex.

[73] Assignee: Datotek, Inc., Dallas, Tex.

[21] Appl. No.: 741,014

[22] Filed: Nov. 11, 1976

[51] Int. Cl.² ............................................. H04L 9/00
[52] U.S. Cl. ................................. 178/22; 179/1.5 R; 325/122; 331/78; 364/717
[58] Field of Search ............................ 178/22; 331/78; 325/122; 179/1.5 R; 235/152

[56] References Cited

U.S. PATENT DOCUMENTS

| | | | |
|---|---|---|---|
| 3,522,374 | 7/1970 | Abrahamsen et al. | 178/22 |
| 3,700,806 | 10/1972 | Vasseur | 178/22 |
| 3,781,472 | 12/1973 | Goode et al. | 178/22 |
| 3,838,259 | 9/1974 | Kortenhaus | 331/78 |

*Primary Examiner*—S. C. Buczinski
*Attorney, Agent, or Firm*—Richards, Harris & Medlock

[57] ABSTRACT

The specification discloses a random digital code generator operable over a series of key cycles for generating a randomized digital bit during each key cycle. The generator includes a plurality of first registers each having a predetermined cycle period which does not have a common factor with the cycle period of any other of the first registers. Circuitry is provided to step each of the first registers a predetermined number of steps per key cycle. A plurality of second registers are provided, along with circuitry for generating different numbers of clocking signals per key cycle for each of the second registers. Circuitry generates control pulses in response to the clocking signals and further in response to digital bits derived from selected taps on the first registers. The control pulses randomly control the number of times each of the second registers is stepped during each key cycle. The number of steps taken by each of the second registers does not have any common factor with the number of steps taken by any of the other second registers. Circuitry is responsive to the outputs of the second registers in order to generate a randomized digital bit during each key cycle. This circuitry includes two levels of multiplexing and further includes bit flipping and spoof circuitry to enhance the security and randomness of the generator.

32 Claims, 1 Drawing Figure

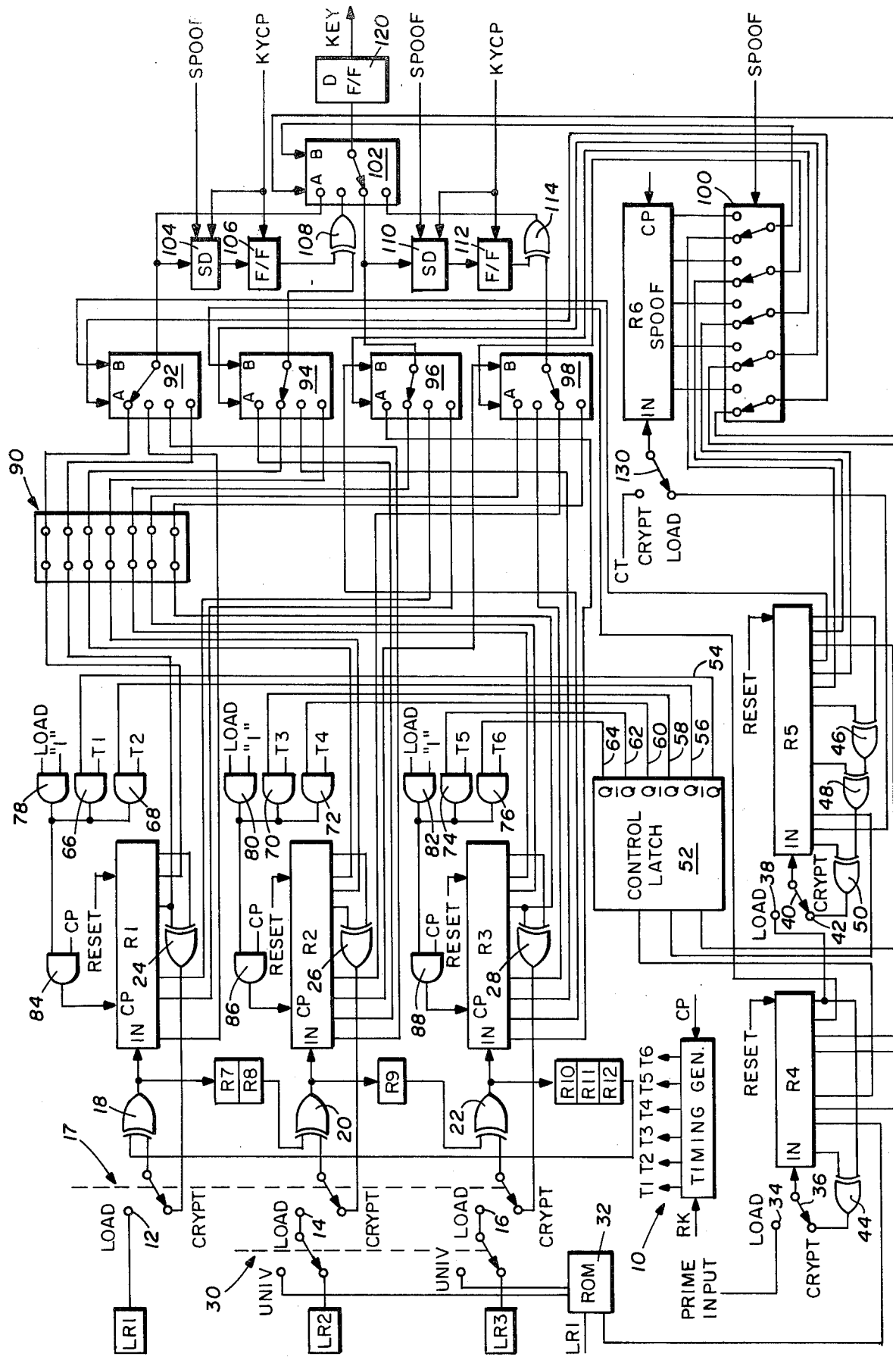

RANDOM DIGITAL CODE GENERATOR

FIELD OF THE INVENTION

This invention relates to random code generators, and more particularly relates to random digital code generators for use with cryptographic systems.

THE PRIOR ART

It has been previously known to use random digital code generators to generate long key streams of randomized digital bits for use in cryptographic or enciphering systems. The randomized key stream is used to control the enciphering of "plain text" into "cipher text", such as by modulo-'adding the randomized key stream with the plain text. An example of such a cryptographic system is described and claimed in U.S. Pat. No. 3,781,472, issued Dec. 25, 1973, and assigned to the present assignee.

Previously developed random code generators have often used various combinations of shift register generators to produce a random digital key stream. An example of such a prior system is described in U.S. Pat. No. 3,522,374, issued July 28, 1970. However, with many such previously developed code generators, it has been possible in certain circumstances to select certain combinations of shift register generator interconnections which result in undesirable short cycle periods for the generated random key stream. Such short cycle periods substantially reduce the security level of the cryptographic system.

Other types of random code generators have randomly interconnected shift registers in a variety of interconnections in order to further increase the complexity and therefore the security of the random code generator. An example of such a prior system is described and claimed in U.S. Pat. No. 3,781,473, issued Dec. 25, 1973, and assigned to the present assignee. However, again with the use of such systems, it has been possible to utilize various interconnections which provide a relatively short cycle. Many such previous systems have also required that reqisters utilized therein have different lengths or stages which are not "prime" to one another. The use of different length registers has often resulted in relatively complex control circuitry.

A need has thus arisen for a random digital code generator which produces digital key streams of extremely long cycle periods and which does not have cycle periods which vary over a wide range of lengths. Moreover, a need has arisen for a random code generator which does not require extremely complex control circuitry and which allows the use of shift registers of identical lengths. A need has also arisen for a random code generator which includes various safety features and various levels of encoding in order to enhance the security of the resulting cryptographic system.

SUMMARY OF THE INVENTION

In accordance with the present invention, a random code generator is provided which essentially reduces or eliminates many of the problems heretofore associated with previously developed random code generators.

In accordance with the present invention, a random code generator is operable over a series of key cycles for generating a randomized digital bit during each key cycle. A plurality of first sequential stepping circuits each have a predetermined cycle period which does not have a common factor with the cycle period of any other of the stepping circuits. Circuitry is provided to step each of the first sequential stepping circuits a predetermined number of steps per key cycle. A plurality of second sequential stepping circuits are associated with circuitry for generating different numbers of clocking signals per key cycle for each of the second sequential stepping circuits. Circuitry generates control pulses in response to the clocking signals and in response to digital bits derived from selected taps on the first sequential stepping circuit. The control pulses randomly control the number of times each of the second sequential stepping circuits is stepped during each key cycle. Circuitry is responsive to the outputs of the second sequential stepping circuits for generating a randomized digital bit during each key cycle.

In accordance with another aspect of the invention, a random code generator is provided to generate a randomized digital key stream. A plurality of first registers of different lengths and different cycle periods are provided. The cycle period of each of the first registers does not include common factors with the cycle periods of any of the remaining ones of the first registers. A plurality of second registers are associated with circuitry for individually clocking the second register in dependence upon the digital data contained within different ones of the first registers. Circuitry receives the output from the second registers and generates a randomized digital key stream in response thereto.

In accordance with a more specific aspect of the present invention, a random code generator is operable over a series of key cycles to generate a randomized digital bit during each key cycle. A plurality of autonomous first registers each have a predetermined cycle period which does not have a common factor with the cycle period of any other of the first registers. The number of zero and one digital bits generated by each of the first registers during a cycle period is known and is substantially equal. Circuitry clocks each of the first registers for a predetermined number during each key cycle. The predetermined number does not have a common factor to the cycle period of any of the first registers. A plurality of autonomous second registers is associated with circuitry for generating two sets of clock pulses for each of the second registers during each key cycle. Circuitry selects one of the sets of clock pulses in dependence upon a digital bit contained in one of the first registers and applies the selected set of clock pulses to clock one of the second registers a number of steps during a key cycle. A mutiplexer is responsive to the outputs of the second registers and is operable in response to outputs from the first and second registers for selecting ones of the outputs of the second registers to form a key stream having a randomized digital bit for each key cycle.

In accordance with yet another aspect of the present invention, a digital random code generator is provided wherein a randomized digital key stream enciphers a plain text to create cipher text. Circuitry generates the randomized digital key stream in response to a portion of cipher text previously generated by utilizing previous portions of the randomized digital key stream.

DESCRIPTION OF THE DRAWINGS

For a more complete understanding of the present invention and for further advantages and objects thereof, reference is now made to the following description taken in conjunction with the accompanying drawings, in which the FIGURE illustrates in schematic detail the present random code generator.

DESCRIPTION OF THE PREFERRED EMBODIMENT

Referring to the drawing, a schematic diagram of the present random code generator is illustrated. The present system is operable over a series of key cycles in order to generate a randomized or pseudorandom digital bit during each key cycle. The initiation of each key cycle is initiated by the generation of a request for key signal (RK) which is applied to a timing generator 10 along with a clock pulse (CP). The timing generator generates a series of clocking signals T1–T6. Each of the clocking signals T1–T6 represents a different number of clock pulses which are to be applied during a key cycle. For example, clocking signal T1 may represent one clock pulse per key cycle, while signal T2 represents two clock pulses per key cycle and signal T3 represents three clock pulses per key cycle. T4 may represent, for example, five clock pulses per key cycle.

The circuitry also includes a set of three registers R1, R2 and R3, which comprise autonomous sequential stepping circuits, each of which may have the same number of register stages. The operation of registers R1–R3 is randomly controlled by another set of two sequential stepping circuits or registers R4 and R5. Prior to operation of the random code generator, digital sequences are input into registers R1–R3 via terminals labeled LR1–LR3. The terminals LR1–LR3 may be connected to, for example, outputs from thumbwheel switches or from any other manually operable source of digital bits. This enables the operator to set in a selected "Code for the Day" to provide the basic key variables for the generator. The digital signals applied to terminals LR1–LR3 are fed respectively to LOAD terminals 12, 14 and 16. Ganged switch arms 17 are selectively moveable into contact with terminals 12–16, such that the LR1–LR3 digital inputs are applied through exclusive OR gates 18, 20 and 22 to the inputs of registers R1–R3 when in the LOAD mode. The output of gate 18 is applied through one bit registers R7 and R8, the output of which is applied as the second input to the exclusive OR gate 20. The output of gate 20 is applied through a single bit register R9, the output of which is applied as the second input to the exclusive OR gate 22. The output of gate 22 is applied through single bit registers R10–R12, the output of which is applied as the second input of the exclusive OR gate 18.

When the ganged switch arms 17 are switched to the CRYPT terminals associated with the registers R1–R3, the digital information stored within the registers is cycled from the output of the registers back to the input of the registers. Specifically, output taps of register R1 are applied to the input of an exclusive OR gate 24, the output of which is attached to the CRYPT terminal associated with gate 18. Similarly, output taps of register R2 are applied as inputs to an exclusive OR gate 26, the output of which is applied to the CRYPT terminal associated with the input of gate 20. Output taps of register R3 are applied as inputs to an exclusive OR gate 28, which has an output applied to the CRYPT terminal associated with the input of gate 22.

When it is desired to change the coding complexity of the system, ganged switch arms 30 may be moved out of contact with terminals LR2 and LR3 and into contact with the universal (UNIV) terminals which are connected to the output of a read only memory (ROM) 32. ROM 32 has stored therein a non-linear digital code configuration. The portion of the code configuration output by the ROM 32 is responsive to an input address derived from LR1 and from an output tap of register R4. Depending upon the input address applied to the ROM 32, the output of the ROM 32 will apply a non-linear code to the UNIV terminals for loading into the registers R2 and R3.

The purpose of the change of complexity is to offer two levels of security. The UNIV mode provides a lower level of security, and only the key variables injected on LR1 are required to initiate the generator. In the higher level of security, variables are injected on all lines LR1-3. Although only one-third the number of variables are used in the UNIV mode, the cycle length of the system if not reduced.

In order to initialize the starting point of the random code generator, an initializing or prime digital sequence is loaded into the registers R4 and R5. The use of such a prime digital sequence is known and is described in U.S. Pat. No. 3,781,472, issued Dec. 25, 1973, and in U.S. Pat. No. 3,781,473, issued Dec. 25, 1973. The prime digital sequence is applied to the LOAD terminal 34. A switch arm 36 is moveable between the CRYPT terminal and the LOAD terminal in order to selectively connect terminal 34 to the input terminal of the register R4. The output stage of register R4 is applied to a LOAD terminal 38 which is associated with a switch arm 40 and a CRYPT terminal 42. When the switch arm 40 is in contact with terminal 38, a portion of the prime sequence is input into register R5.

Once the prime digital sequence is loaded into registers R4 and R5, the switch arms 36 and 40 are moved to the CRYPT terminals and the prime data is recirculated from the inputs to the inputs of the registers R4 and R5. Specifically, two output taps of register R4 are connected to an exclusive-OR gate 44, the output of which is applied to the CRYPT for recirculation to the input terminal of the register R4. This forms a shift register generator with a maximal length cycle period. Similarly, output taps of register R5 are applied to an exclusive-OR gate 46, the output of which is applied, along with another output tap of R5, to an exclusive-OR gate 48. The ouput of gate 48 is applied, along with another output tap of R5, to an exclusive-OR gate 50. The output of gate 50 is applied to the CRYPT terminal 42 for circulation back into the input of register R5. This forms a shift register generator with a maximal length cycle period. Reset signals are applied to registers R4 and R5 for resetting when desired.

An output tap from register R4 is applied to an input to a control latch 52. Similarly, two selected output taps from register R5 are applied as inputs to the control latch 52. Control latch 52 latches the data from registers R4 and R5 prior to each key cycle. The output of control latch 52 comprises six leads 54–64 which are interconnected to control the stepping operation of registers R1–R3. A pair of the ouput lines are associated with each of the input lines to latch 52, with one line of each pair containing the digital complement appearing on the other line of the pair. Each pair of output lines thus provides an indication of the number of digital ones and zeroes appearing on the associated input line. For example, output line 54 is applied as an input to AND gate 66, while output lead 56 is applied as an input to AND gate 68. Output lead 58 is applied as an input to AND gate 70, while output lead 60 is applied to AND gate 72. Output lead 62 is applied to AND gate 74, while output lead 64 is applied to AND gate 76. The LOAD signal, supplied by exterior control circuitry, is applied as an input to AND gates 78, 80 and 82. Similarly, a digital "one" is applied as the second input to AND gates 78, 80 and 82.

The output of gates 66, 68, and 78 are tied together and are applied as an input to AND gate 84. The clock pulse (CP), supplied by exterior control circuitry, is applied as the input to gate 84. The output of AND gate 84 is applied as the clock pulse for register R1 in order to determine the number of steps taken by register R1 during each key cycle. Similarly, the outputs of gates 70, 72 and 80 are tied together and are applied as an input to AND gate 86. The CP signal is applied as a second input of gate 86. The output of gate 86 is applied as the clock pulse for register R2 in order to determine the number of steps taken by the register R2 during each key cycle. Similarly, the outputs of gate 74, 76 and 82 are tied together and are applied as an input to gate 88. The clock pulse CP is applied as a second input of gate 88. The output of gate 88 is applied as the clock pulse for the register R3 in order to determine the number of steps taken by register R3 during each key cycle. Thus, the number of steps taken by each of the registers R1–R3 will randomly vary from key cycle to key cycle.

An important aspect of the present invention is that the cycle lengths of periods of registers R4 and R5 have predetermined relationships to one another. Cycle length of each register is defined as the number of clock pulses required until the digital output generated by the register begins to repeat the previous cycle. For example, if register R4 has eleven stages, the cycle period of the register would be 2047. The cycle length of register R4 is chosen so that it does not have a common factor with the cycle length of the register R5, and thus extremely long cycle periods may be provided by the present random code generator. The cycle periods of registers R4 and R5 are thus chosen to be different and not to have any common factors therebetween. It will be understood that this limitation enables numerous different cycle lengths to be chosen for registers R4 and R5. Additionally, it will be understood that additional registers could be added in series with registers R4 and R5 to enhance the security of the system, so long as the cycle periods of the new registers do not have any common factors with the cycle periods of registers R4 and R5.

Another important aspect of the present invention is that the number of digital "ones" and digital "zeroes" generated by stepping registers R4 and R5 through the complete cycle is exactly known. Furthermore, the number of digital ones and zeroes provided by each register should be substantially equal. That is, looking at a single output stage of either register R4 or R5, the number of digital ones detected will be substantially equal to the number of digital zeroes detected during a complete cycle operation.

The registers R4 and R5 are stepped the same predetermined number of steps each key cycle. Another important aspect of the invention is that this predetermined number of steps is a factor which is not present in any of the cycle periods of registers R4 and R5. For example, if register R4 is provided with eleven stages and has a cycle period of 2047, the factor seven is not present therein. Thus, assuming that the factor seven is also not present in the cycle period of register R5, registers R4 and R5 can both be clocked seven times during each cycle. In this way, each of the registers R4 and R5 will require exactly the same number of key cycles as its cycle period before the register will return to its original initial state. In other words, if register R4 has a cycle period of 2047, it will require 2047 key cycles or 2047 × 7 = 14329 clocks before the register R4 returns to its original state. The ANDing of digital bits derived from taps of registers R4 and R5 (subsequently latched by control latch 52) with the signals T1–T6 derived from the timing generator 10 determines the number of steps that the registers R1–R3 take during each key cycle.

Thus, register R1 is clocked a number of times depending upon the polarity of the digital bit applied from register R5. Register R1 would be clocked for a first number of times for a key cycle if the bit detected at register R5 is a digital zero and for a second predetermined number of times for a key cycle if the bit detected at register R5 is a digital one. Registers R2 and R3 are similarly clocked for varying periods depending upon the digital bit detected at the tap at register R4 or R5. When the number of steps taken by the registers R1–R3 per key cycle is determined by registers R4 and R5, whose cycle lengths and clocking rates have been specifically determined as noted above, a long cycle length operation is provided for the random code generation. Specifically, the number of times register R1 is clocked during each key cycle is determined by multiplying the number of pulses represented by T1 by the number of possibilities of the control bit from register R5 being a zero. The resulting product is added to the product determined by multiplying the number of pulses represented by T2 by the number of possibilities that the control bit generated from the tap on register R5 will be a digital one. The sum of the two products then represents the number of times register R1 is stepped per a complete cycle operation of register R5.

An important aspect of the invention is that the above noted sum of the two products for register R1 does not have any common factors or multiples with the sum of the products for registers R2 or R3.

Similarly, the number of clocks or steps that register R2 takes per key cycle per complete cycle operation of register R5 is determined by multiplying the number of pulses represented by T3 by the probability of the control bit from register R5 being a digital zero and adding the resulting product to the product determined by multiplying the number of pulses determined by T4 by the probability that the digital bit appearing at the output tap of register R5 will be a digital one. The sum determined by the above-noted calculation for register R2 should not have a common factor with the sums determined for register R1 or R3. When the above-noted criteria are met, the present system generates a very long stream of randomized digital bits to provide a very secure random code generator for use with cryptographic devices.

Selected output taps of registers R1–R3 are connected through a permuting box 90 for application to a first level of multiplexing provided by four-to-one multiplexing circuits 92, 94, 96 and 98. The connections provided by the permuting box 90 may be manually changed when desired to give additional security to the system. The outputs of the permuting box 90 are connected to various input terminals of the four-to-one multiplexers 92–98 as illustrated. As further shown, certain output taps from registers R1–R3 are directly connected to the inputs of the multiplexers 92–98. The output of the multiplexers 92–98 is determined by the addresses A and B applied to each multiplexer. The addresses for multiplexer 92 are provided from register R5 and from the spoof switch 100, which will be subsequently described. The addresses applied to multiplexer 94 are applied from spoof switch 100 and from register R4. The addresses applied to multiplexer 96 are applied from register R3 and from the spoof switch 100. The addresses applied to multiplexer 98 are applied from register R2 and from spoof switch 100.

Thus, the various addresses applied to the multiplexers 92-98 come from various portions of the present circuitry and provide additional enciphering security to the system. Depending upon the combination of addresses applied to the terminals A and B of each multiplexer, one of the four inputs of each multiplexer will be applied to the single output line of the multiplexer. The output line multiplexer 92 is directly applied to the input of a four-to-one multiplexer 102 which provides a second level of multiplexing.

The output of multiplexer 92 is also applied through a sequence detector 104, the output of which is applied through a flip-flop 106. The output of flip-flop 106 is applied as an input to exclusive-OR gate 108 having an output connected to one of the inputs of multiplexer 102. The output of multiplexer 94 is connected to the second input of the gate 108. The output of multiplexer 96 is directly applied to the third input of multiplexer 102. The output of gate 96 is also applied to a sequence detector 110 and to a flip-flop 112. The output of flip-flop 112 is applied as an input to exclusive-OR gate 114, the output of which is applied to the fourth input of multiplexer 102. The output of multiplexer 98 is applied to the second input of the gate 114.

Multiplexer 102 is controlled by addresses applied from register R4 and from the spoof switch 100. In this manner, one of the four inputs applied to multiplexer 102 is selected by the addresses and is applied to a single output of the multiplexer 102 which is connected to a D flip-flop 120. The output of the D flip-flop 120 is the key output of the system. The key output comprises one randomized digital bit per key cycle as determined by the request key signal (RK) previously described. Due to the unique enciphering techniques provided by the present invention, the key cycle is extremely randomized and has a very long cycle period before the key stream begins to repeat itself.

The sequence detector 104 and flip-flop 106, along with the sequence detector 110 and flip-flop 112, operates as "bit flippers" in order to provide an additional level of enciphering to the key stream. These circuits detect a sequence of two consecutive digital ones at the output of multiplexers 92 and 96. When such a sequence is detected, then the output of the multiplexers 94 and 98 are respectively inverted. Due to this operation, on the average of about one out of every four digital bit outputs, the output of multiplexers 94 and 98 will be randomly inverted.

The spoof feature of the invention makes the key stream a function of the cipher text (CT) generated by the crytographic system, not shown. As is described in U.S. Pat. No. 3,781,472, previously noted, plain text (PT) is enciphered in a cryptographic system by modulo-2 adding the PT with the key stream generated by the present system. The resulting output is encoded as cipher text (CT). The cipher text is then transmitted to a remote station over a data link. Without the spoof feature, an unauthorized party might be able to surreptitiously obtain the plain text and modulo-2 the plain text with the cipher text in order to obtain the key stream.

Utilizing the key stream, the unauthorized person could then possibly encipher another message. However, by enciphering with the key stream being a function of the cipher text, an unauthorized person would not be able to use the deduced key stream to generate another enciphered message which would be accepted by the deciphering unit. The present spoof circuitry provides that enciphering function.

The spoof switch 100 provides addresses for the multiplexers 92-98 and multiplexer 102 in the manner previously described. The spoof switch 100 includes five switches which are each operable to be switched between two positions. When operating without the spoof feature, the five switches of the spoof switch 100 are connected in the manner illustrated in order to connect with various taps from registers R4 and R5. However, when it is desired to operate in the spoof mode, the five switches of the spoof switch 100 are connected to terminals from a spoof register R6. The input of register R6 is connected to a switch arm 130 moveable between a CRYPT terminal and a LOAD terminal.

When the switch arm 130 is connected to the LOAD terminal, the register R6 is loaded with data from register R5. This data is used in the first key cycle before cipher text is generated. Thereafter, when operating in the spoof mode, the switch arm 130 is moved to the CRYPT terminal and the spoof register R6 is loaded with a predetermined number of digital bits of cipher text (CT). Hence, when clocked by the clock pulse CP, cipher text is transmitted through the spoof switch 100 and is used to address the multiplexers. The resulting key stream is thus a function of the previously generated ciphered text. If the unauthorized person does derive a key, if he then tries to encipher new plain text, he will obtain a meaningless cipher text.

To summarize the overall operation of the system, a predetermined randomized prime input is loaded into registers R4 and R5 during the LOAD mode. Registers R1-R3 are also loaded with Code for the Day digital sequences from LR1-LR3 or from ROM 32. Upon receipt of a request for key (RK), the prime data is circulated through registers R4 and R5 and the digital bits passing past selected taps of registers R4 and R5 are applied to the control latch 52 for ANDing with various ones of the timing signals T1-T6 generated by the timing generator 10. The resulting signals are applied to step registers R1-R3 different numbers of times during each key cycle. In this manner, R1-R3 may be provided with the same number of stages, in contradistinction to previously developed systems which require registers of varying stage numbers and which thus require complex control circuitry.

The digital bits generated by stepping of the registers R1-R3 are applied as inputs to a first stage of multiplexers 92-98. The multiplexers 92-98 are addressed by various portions of the circuitry to provide another level of enciphering. The resulting outputs of the multiplexers 92-98 are applied to a second level of multiplexing provided by multiplexer 102. In addition, randomized "bit flipping" is provided by circuits 104-106 and 110-112, as previously described. A spoofing function is provided at the multiplexing stage in order to make the resulting randomized keys a function of previously generated cipher text. The resulting key from the D flip-flop 120 is provided with a very long cycle period and may be utilized to provide a high level of enciphering in a cryptographic system.

The use of the ROM 32 enables the system to be switched between two levels of enciphering complexity, without substantially reducing the cycle length of the random code generator. The provision of the design criteria of non-common factors of various aspects of the circuitry, as noted above, enables a very high cycle length of the system, without the requirement of extremely complex registers and control circuitry.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. A random code generator operable over a series of key cycles for generating a randomized digital bit during each key cycle comprising:
    a plurality of first sequential stepping circuits each having a predetermined cycle period length which does not have a common factor with the cycle period length of any other of said stepping circuits,
    means for stepping each of said first sequential stepping circuits a predetermined number of steps per key cycle,
    a plurality of second sequential stepping circuits,
    means for generating different numbers of clocking signals per key cycle for each of said second sequential stepping circuits,
    means for generating control pulses in response to said clocking signals and to digital bits derived from selected taps on said first sequential stepping circuits, said control pulses randomly controlling the number of times each of said second sequential stepping circuits is stepped during each key cycle, and
    circuitry responsive to the outputs of said second sequential stepping circuits for generating a randomized digital bit during each key cycle.

2. The random code generator of claim 1 wherein the number of zero and one digital bits generated by each of said first sequential stepping circuits are known and are substantially equal.

3. The random code generator of claim 2 and further comprising:
    means for applying first and second different numbers of clocking signals per key cycle to each of said second sequential stepping circuits,
    means for AND combining said clocking signals with the digital ones and zeroes generated by one of said first sequential stepping circuits to generate said control signals.

4. The random code generator of claim 3 wherein each of said control signals is derived by:
    means for generating a first number in response to said first number of clocking signals and the number of digital one bits generated during one cycle operation of one of said first sequential stepping circuits,
    means for generating a second number in response to said second number of clocking signals and the number of digital zero bits generated during one cycle operation of one of said first sequential stepping circuits, and
    means for adding said first and second numbers to derive the number of steps said second sequential stepping circuits take per key cycle per cycle operation of said first sequential stepping circuits.

5. The random code generator of claim 4 wherein said number of steps taken by each of said second sequential stepping circuits does not have any common factors with the number of steps taken by any other of said second sequential stepping circuits.

6. The random code generator of claim 1 wherein said first sequential stepping circuits are stepped each key cycle for a number which is not a common factor to the cycle period length of any of said first sequential stepping circuits.

7. The random code generator of claim 1 and further comprising:
    means for loading said first and second sequential stepping circuits with digital sequences prior to generation of said randomized digital bits.

8. The random code generator of claim 1 and further comprising:
    multiplexing means operable in response to contents of said first and second stepping circuits for selecting outputs of said second stepping circuits to provide said randomized digital bits.

9. The random code generator of claim 8 and further comprising:
    means for generating cipher text in response to said randomized digital bits, and
    means for controlling said multiplexing means in response to a portion of said cipher text.

10. A random code generator for generating a randomized digital key stream comprising:
    a plurality of first registers of different lengths and different cycle periods, the cycle period of each of said first registers not including common factors with the cycle periods of any of the remaining ones of said first registers,
    a plurality of second registers,
    means for individually clocking said second registers in dependence upon the digital data contained within different ones of said first registers, and
    means for receiving the output from said second registers and for generating a randomized digital key stream in response thereto.

11. The random code generator of claim 10 wherein each of said second registers is clocked in dependence upon a different stage of one of said first registers.

12. The random code generator of claim 10 wherein each of said second registers has the same number of stages.

13. The random code generator of claim 10 and further comprising:
    means for loading predetermined digital sequences into said first and second registers prior to generation of the randomized digital key stream.

14. The random code generator of claim 10 wherein the number of times said second registers are clocked during a key cycle does not have a common factor to the cycle period of said first registers.

15. The random code generator of claim 10 wherein each of said first registers are clocked at the same rate, the rate not having a common factor to the cycle period of said first registers.

16. The random code generator of claim 10 wherein the number of steps taken by each of said second registers while generating one key bit does not have a common factor with the cycle period of said first registers.

17. The code generator of claim 10 and further comprising:

a plurality of first multiplexing means each having plural inputs connected to stages of said second registers and having address inputs connected to stages of said first and second registers, and each of said multiplexers having an output operable to be connected to any one of said multiplexer inputs in dependency upon said address inputs.

18. The code generator of claim 17 and further comprising:

second multiplexing means connected to receive the output of said first multiplexing means, said second multiplexing means having address inputs operable in response to outputs of said stages of said first registers.

19. The code generator of claim 18 and further comprising:

bit flipping means for inverting the output of said first multiplexing means in dependency upon a predetermined pattern of output bits from predetermined ones of said first multiplexing means.

20. The code generator of claim 19 and further comprising:

means for controlling one of said address inputs of said second multiplexing means in dependence upon cipher text generated as a result of the randomized key stream previously generated by said random code generator.

21. The random code generator of claim 10 and further comprising:

storage means containing non-linear digital sequences for being loaded into the input of said second registers.

22. The random code generator of claim 21 wherein the digital sequences stored within said storage means is selected in response to one of said first registers.

23. A random code generator operable over a series of key cycles to generate a randomized digital bit during each key cycle comprising:

a plurality of autonomous first registers each having a predetermined cycle period which does not have a common factor with the cycle period of any other of said first registers, the number of zero and one digital bits generated by each of said first registers during a cycle period being known and substantially equal, means for clocking each of said first registers for a predetermined number during each key cycle, said predetermined number not having a common factor to the cycle period of any of said first registers, a plurality of autonomous second registers, means for generating two sets of clock pulses for each of said second registers during each key cycle, means for selecting one of said sets of clock pulses in dependence upon a digital bit contained in one of said first registers and for applying the selected set of clock pulses to clock one of said second registers a number of steps during a key cycle, and a multiplexer responsive to the outputs of said second registers and operable in response to outputs from said first and second registers for selecting ones of said outputs of said second registers to form a key stream having a randomized digital bit for each key cycle.

24. The random code generator of claim 23 and further comprising:

means for loading predetermined digital sequences into said first and second registers prior to generation of the randomized key stream.

25. The random code generator of claim 24 wherein the number of times said second registers are clocked during a key cycle does not have a common factor to the cycle period of said first registers.

26. The code generator of claim 23 and further comprising:

a plurality of first multiplexing means each having plural inputs connected to stages of said second registers and having address inputs connected to stages of said first and second registers, and each of said multiplexers having an output operable to be connected to any one of said multiplexing inputs in dependence upon said address inputs.

27. The code generator of claim 23 and further comprising:

second multiplexing means connected to receive the output of said first multiplexing means, said second multiplexing means having address inputs operable in response to outputs of said stages of said first registers.

28. The code generator of claim 23 and further comprising:

bit flipping means for inverting the output of said first multiplexing means in dependence upon a predetermined pattern of output bits from predetermined ones of said first multiplexing means.

29. The code generator of claim 23 and further comprising:

means for controlling one of said addresses of said second multiplexer means in dependence upon cipher text generated as a result of the randomized key stream previously generated by said random code generator.

30. The random code generator of claim 23 and further comprising:

storage means containing non-linear digital sequences for being loaded into the input of said second registers.

31. The random code generator of claim 30 wherein the sequences stored within said storage means are selected in response to one of said first registers.

32. In a digital random code generator wherein a randomized digital key stream enciphers plain text to create cipher text, the spoofing combination comprising:

a key generator for generating a randomized digital key stream, cipher means responsive to said key stream for enciphering plain digital text into cipher digital text, means coupled between said key generator and the output of said cipher means for partially controlling the generation of said randomized digital key stream in response to a portion of said cipher digital text previously generated in order to inhibit unauthorized deduction of said randomized digital key stream.

* * * * *

UNITED STATES PATENT AND TRADEMARK OFFICE
CERTIFICATE OF CORRECTION

PATENT NO. : 4,115,657
DATED : September 19, 1978
INVENTOR(S) : Barrie O. Morgan It is certified that error appears in the above-identified patent and that said Letters Patent are hereby corrected as shown below:

Column 1, line 15, change "modulo-' adding" to --modulo-2 adding--

Column 4, line 35, change "inputs" to --outputs--;
Column 4, line 38, after "CRYPT" add --terminal--;
Column 4, line 51, change "to" to --as--;
Column 5, line 27, change "of" to --or--:

Column 7, line 48, change "operates" to --operate--;
Column 8, line 64, change "keys" to --key--.

Signed and Sealed this

Eighth Day of May 1979

[SEAL]

Attest:

RUTH C. MASON
Attesting Officer

DONALD W. BANNER
Commissioner of Patents and Trademarks